3,444,157
PROCESS FOR THE MANUFACTURE OF AQUEOUS
AZO AND BASIC LAKE PIGMENTS
Hideo Tanaka, Nakano-ku, Tokyo, and Katsushiro
Inagaki, Daito-ku, Tokyo, Japan, assignors to
Dainichiseika Color & Chemicals Mfg. Co., Ltd.,
Tokyo, Japan, a corporation of Japan
No Drawing. Filed Mar. 16, 1964, Ser. No. 353,018
Int. Cl. C09b 29/06, 63/00, 67/00
U.S. Cl. 260—176            3 Claims The present invention relates to a process for the manufacture of aqueous coloring solutions, and more particularly relates to a process for the manufacture of aqueous azo and basic dye lake pigments.

Generally, an aqueous dispersion of pigment has hitherto been used in pigment printing, dope dyeing of chemical fibers, and in water paints. The aqueous dispersion of pigment has been generally prepared by mechanically dispersing, with a suitable apparatus such as a mill, the pigment into water which contained a dispersing agent, if necessary in the presence of a protective colloid.

In such a process in which the mechanical grinding is carried out after the pigment is formed, it is generally difficult to disperse the pigment in water in the state of primary particles and therefore the pigment in the dispersion is precipitated. Further, since the pigment in the dispersion is in a state of primary and/or multiple particles, the coloring power is limited. In addition, there are disadvantages in that an expensive apparatus and a complicated operation are necessary for the preparation of an aqueous dispersion of pigment.

Furthermore, various dispersing apparatus have been industrially used, but in these cases the grain size of the obtained pigment may be more or less varied by the kind of pigment. However, the maximum grain size of pigment obtained is about 0.3 to $3\mu$ and the pigment obtained often contains particles of several ten $\mu$. So a precipitation of particles of pigment is usually formed and thus an addition of protective substances is required in order to inhibit the precipitation, but it is almost impossible to obtain a satisfactory result when a dispersion system having a distribution of certain sized particles is desired or when the occurrence of precipitation phenomena is to be inhibited, the dispersion has many disadvantages in it's use as a coloring agent and it is impossible to manufacture a uniform final product.

Furthermore, although it has been proposed to provide a process for dispersing an insoluble azo pigment in an aqueous medium in which impurities in aromatic diazo compounds are removed and the purified diazo compounds are treated with a stabilizing agent, and then the treated diazo compound is coupled with a coupler in the presence or absence of certain surface active agent, this process has the disadvantages in that very complicated process for manufacturing the stabilized diazo compound and the process for removing impurities are necessary, and a danger of explosion is present in the processes.

Furthermore, it is a characteristic that basic dyestuffs have a very clear color, but they exhibit a disadvantage in that they have a poor light resistance. In order to reduce this disadvantage the basic dyestuff is laked with a laking agent to change it into water-insoluble lake form. However, since the lake is water-insoluble, it is necessary, if the lake is used as a coloring agent in water inks, paper-coating, pigment printing or, water paints, to use an aqueous dispersion which is obtained by dispersing it in water by the use of a mill in the presence of a dispersing agent and, if necessary, a protective colloid.

We have now found that aqueous azo pigments can be obtained by coupling aromatic diazo compounds with coupling components in the presence of amphipathic organic compounds and also that aqueous lake pigments can be obtained by laking basic dyestuffs with laking agents in the presence of amphipathic organic compounds. Amphipathic organic compounds are those compounds having an affinity for both oil and water.

According to the present invention, a process is provided for the manufacture of aqueous coloring solutions characterized in that a reaction for the formation of an azo or basic dye laked pigment is carried out in the presence of an amphipathic organic compound which solubilizes the formed pigment in water, the solubilization being effected at the same time the pigment is formed.

As examples of the amphipathic organic compound which may be used in the process of the present invention, there can be mentioned ethers of polyethylene glycols and long chain alcohols, esters of polyethylene glycols and long chain carboxylic acids, ethers of polyethylene glycols and alkyphenols, polyesters of polyalcohols esterified with long chain carboxylic acids, and condensation products of propylene oxide and ethylene oxide. The aqueous coloring solutions of the present invention are produced by forming the azo or basic dye laked pigments in the presence of 80 to 150 percent by weight of an amphipathic organic compound, based on the weight of the pigment formed.

As examples of the aromatic diazo compounds which may be used in the manufacture of an aqueous azo pigment according to the process of the present invention, may be mentioned those which are derived from any known base such as, for example, 2-methyl-5-nitroaniline, 4,4'-diamino-3,3'-dichlorodiphenyl, 2,5-dichloroaniline, 2-methyl-5-chloroaniline, 2-methyl-4-chloroaniline, 2-methoxy-5-chloroaniline, 3-chloroaniline, 2-benzoxy-5-chloroaniline, ortho-chloroaniline and the like.

As examples of the coupling components which may be used in the manufacture of aqueous azo pigments according to the process of the present invention, may be mentioned beta naphthol, beta-hydroxy naphthoic acid, acetoacetic acid allyl amide, naphthol AS, pyrazolone and their derivatives and the like.

As examples of the basic dyestuffs which may be used in the manufacture of aqueous lake pigment according to the process of the present invention, may be mentioned any known basic dyestuffs such as Rhodamine 6GCP, Victoria blue B, Methyl violet, Rhodamine B and the like.

In the process of the present invention, the additional inclusion of a deflocculant such as a naphthaline sulphonic acid-formaldehyde condensation product, a dialkyl sulpho succinate, an alkylbenzene sulphonic acid salt and the like in addition to the amphipathic organic compound, increases the ease with which the reaction is conducted; further, a gelling of formed pigment does not occur and the viscosity of the formed solution can be lowered.

The preferred amount of the deflocculant which is used in the process of the present invention is in a range of 10 to 30% by weight of the formed pigment.

In the practice of the process of the present invention, if necessary a hydrophilic substance such as for example polyvinyl alcohol, gelatin, gum arabic, starch, cellulosic derivatives or the like can be added when the pigment forming reaction is carried out or after the pigment forming reaction is completed.

Although the content of pigment in the aqueous coloring solutions which are manufactured in the process of the present invention may be varied depending upon its use the aqueous coloring solution which contains more than 3% by weight of pigment can be practically and broadly used. Especially, it is useful to employ an aqueous coloring solution which contains 10 to 15% by weight of pigment.

When the aqueous coloring solution which is manufactured in the process of the present invention is used for pigment prining, coloring of fibers, water paint, leather, paper making, or coloring of cement, and the like, a considerable coloring effect can be obtained.

The present invention is illustrated but not limited by the following examples in which the parts and percentages are by weight.

EXAMPLE 1

21.8 parts of 2-methyl-5-nitroaniline were diazotized with 42.0 parts of 35% hydrochloric acid and 9.8 parts of sodium nitrite at a temperature of 0° C., by a conventional method. 400 parts of diazotized solution which were thus obtained and maintained at the temperature of 0° C. were poured into 210 parts of aqueous suspension which contained 40.6 parts of naphthol AS–D, 13.1 parts of sodium hydroxide and 62.0 parts of polyoxyethylene nonylphenyl ether (added mol:40 mols) at 20° C. with stirring to effect a coupling reaction.

The content of pigment in the obtained aqueous coloring solution in which azo pigment was formed and at the same time was gradually dissolved into water was about 10%. The content of the amphipathic organic substance in the aqueous coloring solution was about 100% by weight of the formed pigment. This aqueous coloring solution was a clear reddish brown solution which has a high coloring power and a high stability.

EXAMPLE 2

38 parts of 4,4′-diamino-3,3′-dichlordiphenyl were tetrazotized with 47 parts of 35% hydrochloric acid and 21 parts of sodium nitrite at a temperature of 0° C. by a conventional method. 400 parts of tetrazotized solution which were thus obtained and maintained at a temperature of 0° C. were poured into 350 parts of acetic acid acidic suspension which contained 59 parts of acetoacetic orthotoluidide, 12 parts of sodium hydroxide, 117 parts of polyoxyethylene lauryl ether (mols of added ethylene oxide: 35 mols) and 38 parts of acetic acid at a temperature of 20° C. with stirring to effect a coupling reaction.

The content of pure pigment in the obtained aqueous coloring solution in which azo pigment was formed and at the same time was gradually dissolved into water was about 13%. The content of the amphipathic organic substance in the aqueous coloring solution was about 120% by weight of the formed pigment. This aqueous coloring solution was a clear yellowish brown solution which has a high coloring power, gives clear color and a high stability.

EXAMPLE 3

21.8 parts of 2-methyl-5-nitroaniline were diazotized with 42.0 parts of 35% hydrochloric acid and 9.8 parts of sodium nitrite at a temperature of 0° C. by a conventional method. 400 parts of diazotized solution which were thus obtained and maintained at 0° C. were poured into 210 parts of aqueous suspension which contained droxide, 62 parts of polyoxyethylene nonylphenylether droxide, 62 parts of polyofyethylene nonylphenylether (40 mols. addition product) and 20.0 parts of naphthalene sulfonic acid-formaldehyde condensation product at the temperature of 20° C. with stirring to effect a coupling reaction.

The content of pigment in the obtained aqueous coloring solution in which azo pigment was formed and at the same time was gradually dissolved into water was about 10%. The contents of amphipathic organic substance and deflocculating agent in the aqueous coloring solution were about 100% and about 32%, respectively by weight of the formed pigment. This aqueous coloring solution was a clear reddish brown solution which has a high coloring power and a high stability.

EXAMPLE 4

38.0 parts of 4,4′-diamino-3,3′-dichlordiphenyl were tetrazotized with 47.0 parts of 35% hydrochloric acid and 21.0 parts of sodium nitrite at a temperature of 0° C. by a conventional method. 400 parts of the tetrazotized solution which were thus obtained and maintained at 0° C. were poured into 350 parts of acetic acid acidic suspension which contained 59.0 parts of acetoacetic ortho toluidide, 12.0 parts of sodium hydroxide, 38.0 parts of sodium acetate, 98.0 parts of polyoxyethylene lauryl ether (40 mols addition product) and 15.0 parts of naphthalene sulfonic acid-formaldehyde condensation product at a temperature of 20° C. with stirring to effect a coupling reaction.

The content of pigment in the obtained aqueous coloring solution in which azo coloring matter was formed and at the same time was gradually dissolved into water was about 13%. The contents of amphipathic organic substance and deflocculating agent in the aqueous coloring solution were about 100% and about 15%, respectively by weight of the formed pigment. This aqueous coloring solution was a clear yellowish brown solution which has a high coloring power and a high stability.

EXAMPLE 5

500 parts of solution which contained 76 parts of sodium tungstate, 26 parts of sodium molybdate, 14 parts of sodium dihydrogen phosphate and 30 parts of concentrated sulfuric acid were gradually poured into 1,100 parts of dyestuff solution obtained by dissolving 48 parts of Rhodamine 6GCP, 14 parts of glacial acetic acid and 160 parts of polyethylene glycol lauryl ether into 800 parts of water at a temperature of 20° C. with stirring to effect a lake reaction. The lake was formed and at the same time was gradually dissolved into water to obtain an aqueous coloring solution containing dyestuff lake. The content of lake pigment and amphipathic organic substance in the obtained aqueous coloring solution was about 7%. The content of amphipathic organic substance in the obtained aqueous coloring solution was about 160% by weight of the formed pigment. The aqueous coloring solution was a clear darkish red solution which has a high coloring power and a high stability.

EXAMPLE 6

340 parts of a solution which contained 37 parts of tannin powder, 13 parts of sodium acetate, 6 parts of tartar emetic and 20 parts of polyethylene glycol nonylphenyl ether (mols of added ethylene oxide: 40 mols) were gradually poured into 380 parts of dyestuff solution obtained by dissolving 30 parts of methyl violet, 1 part of glacial acetic acid and 30 parts of polyethylene glycol nonylphenyl ether (mols of added ethylene oxide: 40 mols) in 320 parts of water at the temperature of 20° C. with stirring to effect a lake reaction.

The content of pigment in the aqueous coloring solution thus obtained was about 8%. The content of amphipathic organic substance in the aqueous coloring solution was about 100% by weight of the formed pigment. This aqueous coloring solution was a clear darkish violet solution which gives clear color and has a high coloring power and a high stability.

EXAMPLE 7

450 parts of a solution which contained 76 parts of sodium tungstate, 26 parts of sodium molybdate, 14 parts of sodium dihydrogen phosphate and 30 parts of concentrated sulfuric acid were gradually poured into 800 parts of an aqueous solution obtained by dissolving 48 parts of Rhodamine 6GCP, 14 parts of glacial acetic acid, 140 parts of polyoxyethylene nonylphenyl ether (mols of added ethylene oxide: 50 mols) and 20 parts of naphthalene sulphonic acid-formaldehyde condensation product in 578 parts of water at 20° C. with stirring to effect a lake reaction. The content of pigment in the aqueous coloring solution was about 8%. The contents of amphipathic substance and defloculant in the aqueous coloring solution were about 140% and about 20%, respectively, by weight of the formed pigment. This aqueous coloring solution was a clear darkish red solution which has a high coloring power and a high stability.

EXAMPLE 8

380 parts of an aqueous solution containing 66 parts of sodium tungstate, 24 parts of sodium molybdate, 13 parts of sodium dihydrogen phosphate, 26 parts of concentrated sulfuric acid and 45 parts of polyoxyethylene lauryl ether were gradually poured into 520 parts of an aqueous solution obtained by dissolving 70 parts of Victoria blue B, 4 parts of glacial acetic acid, 45 parts of polyoxyethylene lauryl ether (mols of added ethylene oxide: 40 mols), and 24 parts of naphthalene sulphonic acid-formaldehyde concendsation product in 377 parts of water at 20° C. with stirring to effect a lake reaction. The content of pigment in the obtained aqueous coloring solution was about 10% at the temperature of 20° C. The contents of amphipathic substance and deflocculant in the obtained aqueous coloring solution were about 90% and 27%, respectively, by weight of the formed pigment. This aqueous coloring solution was a clear darkish blue solution which has a high coloring power and a good stability.

EXAMPLE 9

650 parts of an aqueous solution obtained by dissolving 50 parts of sodium tungstate, 50 parts of sodium molybdate, 17 parts of sodium dihydrogen phosphate, 31 parts of concentrated sulfuric acid and 80 parts of polyoxyethylene nonylphenyl ether (mols of added ethylene oxide: 50 mols) in 412 parts of water at 20° C. were gradually poured into 550 parts of a solution containing 51 parts of Rhodamine B, 3 parts of glacial acetic acid, 45 parts of naphthalene sulphonic acid-formaldehyde condensation product and 40 parts of polyoxyethylene lauryl ether (mols of added ethylene oxide: 35 mols) at 20° C. with stirring to effect a lake reaction. The content of pigment in the obtained aqueous coloring solution was about 10%. The contents of amphipathic substance and deflocculant in the obtained aqueous coloring solution were about 100% and about 20%, respectively, by weight of the formed pigment. This aqueous coloring solution was a clear darkish red solution which has a high coloring power and a very good stability.

What we claim is:

1. In a process for the production of a stable aqueous micro dispersion of an azo pigment by coupling a diazotized aromatic primary amino compound having no water-solubilizing group with an azoic coupling component having no water-solubilizing group in aqueous medium or of a basic dye pigment by laking a basic dyestuff with laking agent in aqueous medium, the improvement of carrying the pigment formation in the presence of an amphipathic organic compound selected from the group consisting of ethers of polyethylene glycols and long chain alcohols, esters of polyethylene glycols and long chain carboxylic acids, ethers of polyethylene glycols and alkylphenols, polyesters of polyalcohol esterified with long chain carboxylic acids, and condensation products of propylene oxides and ethylene oxides, in an amount of from 80 to 150% by weight based on the pigment formed at a suitable temperature which is able to form said pigments, the pigment formed being present in the aqueous micro dispersion in an amount of from about 3 to about 15% by weight, wherein the formation of pigment and micro dispersing of said pigment in water is simultaneously carried out, and wherein said amphipathic organic compound includes more than 35 mols of combined ethylenoxide.

2. A process as defined in claim 1 wherein the pigment-forming reaction is conducted in the presence of a deflocculant selected from the group consisting of naphthalene sulphonic acid-formaldehyde condensate, alkyl trimethyl ammonium chloride, dialkylsulphosuccinate, and alkylbenzene sulphonic acid salts.

3. A process as defined in claim 1 wherein the deflocculant is present in an amount of from 10 to 30 percent by weight based on the weight of pigment formed.

References Cited

UNITED STATES PATENTS

| | | | |
|---|---|---|---|
| 3,003,844 | 10/1961 | Jelinek et al. | 8—93 XR |
| 2,040,796 | 5/1936 | Rittinghausen et al. | 8—93 XR |
| 2,120,552 | 6/1938 | Ellis et al. | 8—93 XR |
| 2,812,321 | 11/1957 | Eberhart et al. | 260—162 XR |
| 2,884,410 | 4/1959 | Randall | 260—192 |
| 2,938,897 | 5/1960 | Armento | 260—159 |
| 3,157,632 | 11/1964 | Ribka | 260—193 |
| 3,200,109 | 8/1965 | Ribka | 260—203 |
| 3,236,583 | 2/1966 | Hees | 8—93 XR |
| 3,272,585 | 10/1966 | Rafferty et al. | 8—93 XR |

FLOYD D. HIGEL, *Primary Examiner.*

U.S. Cl. X.R.

8—92, 93; 106—289; 260—161, 163, 180, 193, 195, 197, 200, 345.3, 391